(12) United States Patent
Zunhammer

(10) Patent No.: US 9,204,593 B2
(45) Date of Patent: Dec. 8, 2015

(54) DEVICE FOR SPREADING LIQUID MANURE

(76) Inventor: Sebastian Zunhammer, Traunreut (DE)

( * ) Notice: Subject to any disclaimer, the term of this patent is extended or adjusted under 35 U.S.C. 154(b) by 608 days.

(21) Appl. No.: 12/863,836

(22) PCT Filed: Jan. 17, 2009

(86) PCT No.: PCT/EP2009/000285
§ 371 (c)(1),
(2), (4) Date: Oct. 11, 2010

(87) PCT Pub. No.: WO2009/092549
PCT Pub. Date: Jul. 30, 2009

(65) Prior Publication Data
US 2011/0036923 A1    Feb. 17, 2011

(30) Foreign Application Priority Data
Jan. 23, 2008   (DE) ............... 20 2008 000 955 U

(51) Int. Cl.
*A01C 23/00* (2006.01)
*A01C 23/04* (2006.01)

(52) U.S. Cl.
CPC ............ *A01C 23/045* (2013.01); *A01C 23/007* (2013.01)

(58) Field of Classification Search
CPC ............................. A01C 21/00; A01C 21/007
USPC ............. 239/650, 651, 63, 67, 69, 674, 677, 239/662, 172; 141/98
See application file for complete search history.

(56) References Cited

U.S. PATENT DOCUMENTS

| | | | | |
|---|---|---|---|---|
| 4,233,922 A | * | 11/1980 | Conway | 114/74 R |
| 4,456,039 A | * | 6/1984 | van der Lely et al. | 141/98 |
| 4,616,979 A | * | 10/1986 | Hynes et al. | 417/231 |
| 4,803,626 A | * | 2/1989 | Bachman et al. | 701/50 |
| 4,907,516 A | * | 3/1990 | Rogers | 111/127 |
| 5,718,377 A | * | 2/1998 | Tedders et al. | 239/8 |
| 2005/0243867 A1 | * | 11/2005 | Petite | 370/474 |

FOREIGN PATENT DOCUMENTS

| | | |
|---|---|---|
| DE | 19520950 C1 | 5/1996 |
| DE | 10142865 A1 | 3/2003 |
| DE | 10318942 A1 * | 11/2004 |
| DE | 202006015589 U1 | 12/2006 |
| DE | 202007000724 U1 | 3/2007 |
| EP | 1752033 A1 | 2/2007 |
| WO | 0064242 A1 | 11/2000 |

OTHER PUBLICATIONS

International Search Report, PCT/EP2009/00284, dated May 25, 2009.

* cited by examiner

*Primary Examiner* — Ryan Reis
*Assistant Examiner* — Viet Le
(74) *Attorney, Agent, or Firm* — Lerner, David, Littenberg, Krumholz & Mentlik, LLP

(57) ABSTRACT

The invention relates to devices for spreading liquid manure, wherein a liquid manure sensor (8) determines the constituents of the liquid manure (G) to be spread and an evaluating unit (10) compares the determined values with predefined constituent data. The quantity of liquid manure (G) to be spread per area unit is calculated based on the result of the comparison. According to the result of the comparison an adjustable valve (6) actuates a distributor device (7) accordingly, by means of which the calculated quantity of liquid manure (G) is spread onto the field.

16 Claims, 3 Drawing Sheets

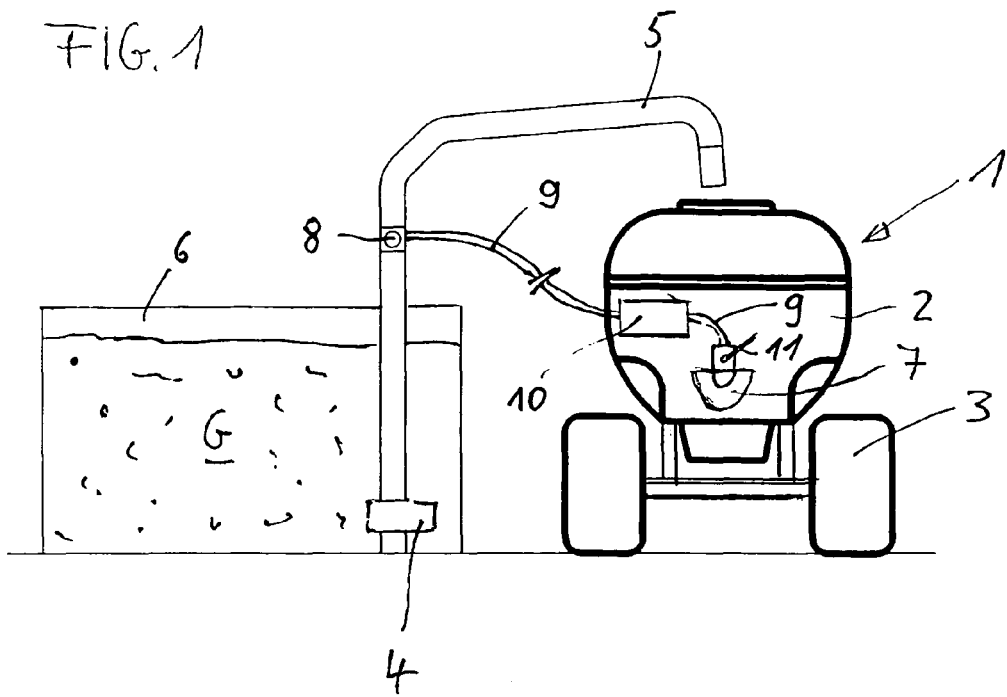
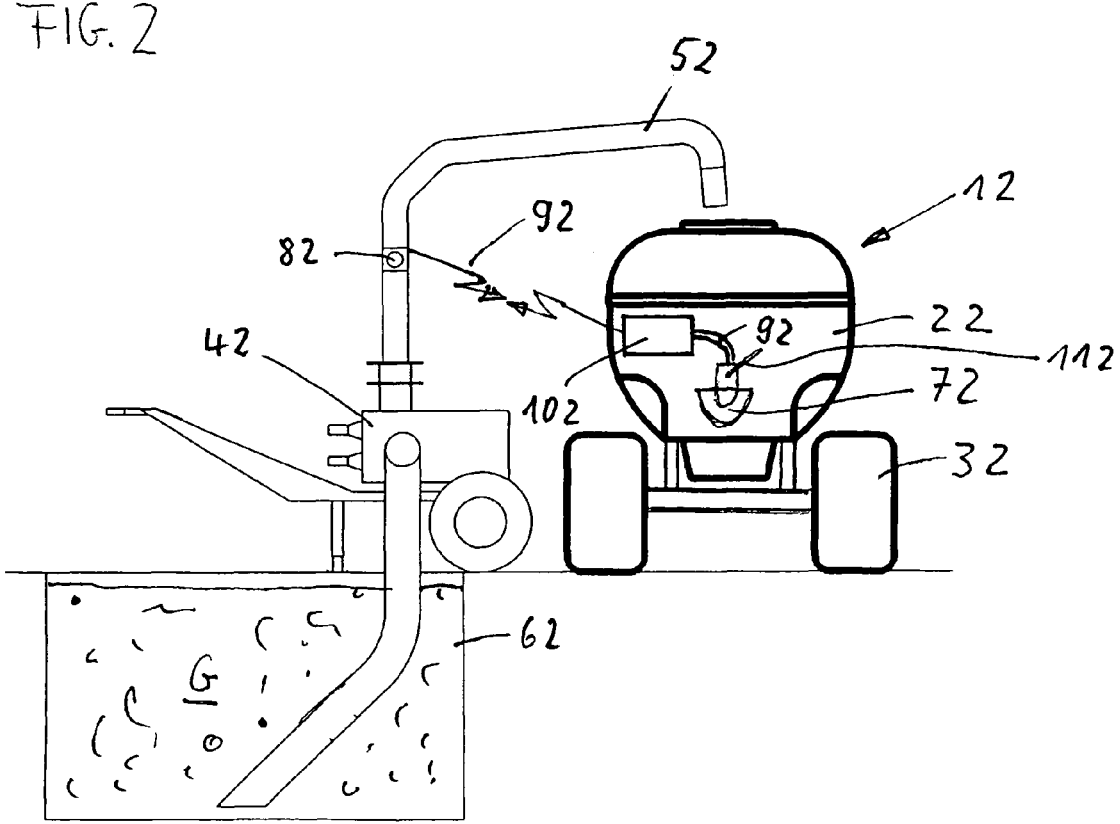

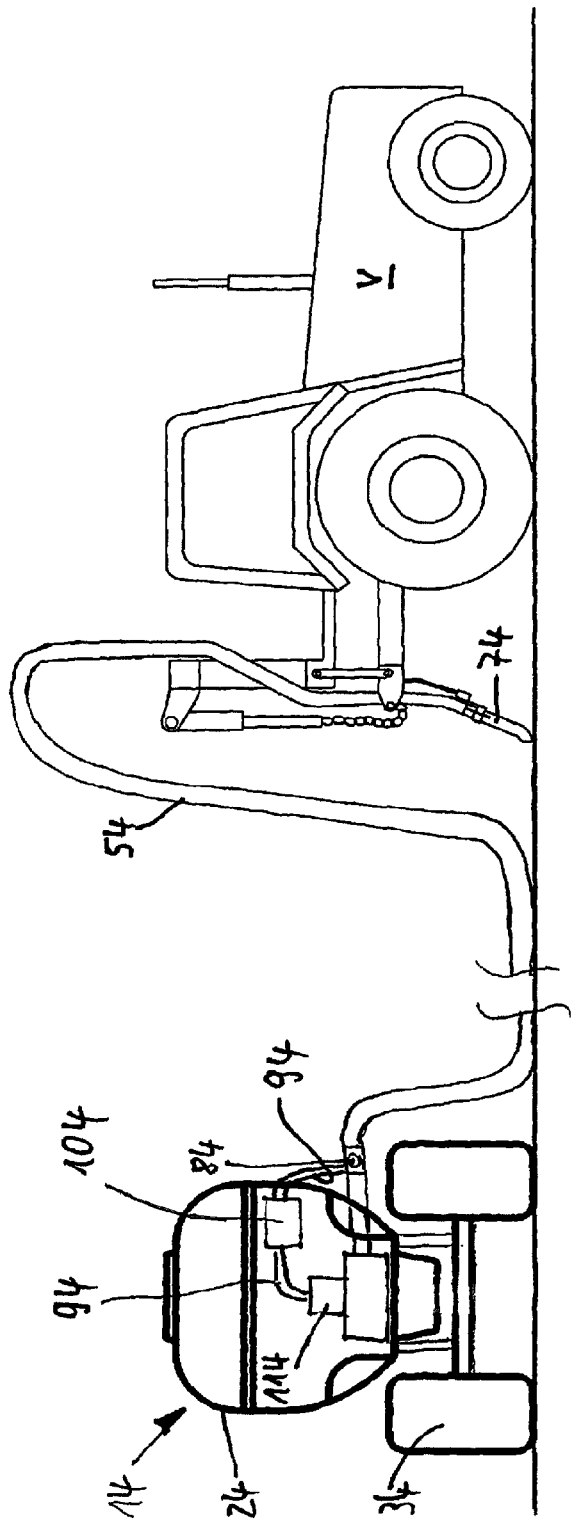

DEVICE FOR SPREADING LIQUID MANURE

CROSS REFERENCE TO RELATED APPLICATIONS

The present application is a national phase entry under 35 U.S.C. §371 of International Application No. PCT/EP2009/000285, filed Jan. 17, 2009, published in German, which claims the benefit of German Patent Application No. 20 2008 000 955.3, filed Jan. 23, 2008. The disclosures of said applications are incorporated by reference herein.

The present invention relates to devices for applying liquid manure according to the preambles of claims 1 and 2.

Liquid manure vehicles are well known. Thus from DE 195 20 950 C1 a liquid manure vehicle is known in which liquid manure is applied close to the ground by a trailing hose spreading device. It is also indicated therein that agricultural technology generally has the task of enabling the application of liquid manure in an environmentally compatible way. For this a plurality of solutions have been proposed, which do not need to be discussed in more detail here, as they propose many different types of solutions.

Known "fertiliser regulations" specify for example what concentration of constituents in the respective liquid manure may be applied onto the fields. It is defined therein for example, how many kilograms (kg) of nitrogen (N) can be applied to the ground per hectare (ha) and year. Nitrogen is only used as an example in the following, whereby it is also significant that nitrogen is seldom provided in liquid manure in a pure form, but rather is mostly contained in various different chemical compounds, for example as an ammonium-nitrogen-compound. However, also the limit values of other constituents are defined there. In order to be able to even approximately satisfy this requirement, the individual constituents of the liquid manure in question have to be known to the user. If the user knows the proportions of the various different constituents, he can influence the nutrient or constituent concentration by controlling the application amount per area unit.

In order to be able to determine the constituents however, it is better to analyse the liquid manure in question than to estimate the constituents by way of guesswork. A prerequisite for meaningful results is that a representative composite sample should be examined. For this the content of the liquid manure reservoir has to be homogenised i.e. mixed for example. As liquid manure is a multi-nutritional fertiliser it means that the application rate is oriented to the nutrient, the requirement for which is covered first.

These findings make it possible to optimise the application of liquid manure, at least theoretically. In practice however, considerable problems have to be taken into account owing to various disruptive factors, which cannot be solved partly with conventional technology. Thus the user has to work with very different forms of liquid manure determined by animal type (pig manure, cow manure, chicken manure) to give only a few examples. Contractors, who collect and apply liquid manure from different agricultural operations, cannot in practice provide a reasonably accurate analysis of the manure. Furthermore, there are communal barrels, for which when the latter are being filled it cannot be assumed that the liquid manure is analytically homogenous. Similarly the constituents of liquid manure from biogas-installations are generally undefined. In a liquid manure reservoir there are layers of sediments of varying densities and so-called floating layers. Furthermore, it has to be assumed that with a full liquid manure container (liquid manure silo) the dry weight proportion at the start is different than at the end of emptying. As a result in practice the constituent amount actually applied onto the ground is only estimated roughly or is unknown, although distribution is performed with a deviation of 5-10% per bcm.

In DE 101 42 865 A 1 a method is described relating to this problem in which functional units (e.g. sensors) are distributed for determining the soil values over a large area in the ground of the farmland (there column 4, lines 40 to 42), likewise over a large area on the ground of the farmland devices are distributed for droplet irrigation or hose irrigation (there column 6, lines 42 to 46). In such stationary systems a high degree of investment is required to provide a larger area of farmland with a plurality of sensors and install a suitably high number of distributor lines with application elements (hoses and nozzles) for distribution over a large area. If transport routes cross the farmland hosing is not practical. The data transmission components mentioned in this document are also very costly in relation to the initial costs and operation, furthermore, expensive redundancy measures have to be provided, in order to ensure the transmission of the measurement and control data is not prone to disruption. Lastly, the result of the liquid manure analysis is very dependent on the type of sampling, as it is significant whether for example pig manure or cow manure or mixed manure is to be processed. The storage of liquid manure in reservoirs should also be taken into consideration (floating layers or deposits of solid particles at the bottom of the reservoir). The preparation of the liquid manure according to this prior art has to take all of these factors into account and the liquid manure to be applied has to be adapted or prepared accordingly, e.g. by the addition of water, i.e. by mixing with fresh water (there column 6, lines 34 ff). It also includes the teaching that the thus prepared liquid manure has to undergo further analysis with additional sensors (column 5, lines 36 to 40). The application should then preferably be performed by known droplet irrigation or hose irrigation. From the description it is clear that the technical and logistical requirement for technically sophisticated data processing and data transfer technology is extremely high, not including the necessity of setting up and operating a laboratory for analysis.

In WO 00/64242 A1 a sensor is known for the spectral-analytical examination of liquids. For example milk is examined therein with such a sensor.

From DE 103 18 942 A1 a method is known for applying liquid manure, in which a liquid manure sensor determines the constituents of the liquid manure to be applied in real time and compares it with predefined constituents. The amount of liquid manure to be applied per area unit is calculated as a function of this comparison result. In this method the liquid manure is analysed during the application, which means that the component such as the sensor and distributor device are exposed to very high stresses during the application drive. The components in question have to operate in real time, which can only be performed with expensive components. Their ability to withstand mechanical stresses owing to the problems that may occur during the application such as vibrations and jolting effects is strongly affected. Furthermore, in the case of blockages on the distributors pressure problems may occur, for example by pulsation, on the sensor, which could influence the measurements.

The underlying problem addressed by the present invention is to create devices by means of which it is easier to take into consideration the legal requirements. By means of the devices an efficient analysis of the liquid manure should be made possible as well as optimisation of the liquid manure application.

This objective is achieved by means of devices which correspond to the features of claims 1 and 2. By means of devices with the features of the dependent claims advantageous embodiments of the invention are provided.

It is particularly advantageous to have a device for optimising the application amount of constituents contained in the liquid manure on the ground to be fertilised, by means of a liquid manure vehicle, if for removing the liquid manure from a reservoir a removal line system is provided, whereby the sensor is arranged in the removal line system.

Furthermore, it is advantageous, if the device comprises a decanting line system for decanting the liquid manure out of a reservoir into a liquid manure vehicle and if the sensor is arranged in the decanting line system.

Furthermore, it is advantageous, if a pump is arranged in the reservoir of the device for the removal of the liquid manure, whereby it is particularly advantageous if the pump is a mobile pump. A mobile pump can be designed particularly advantageously as a mobile pump station.

It is an advantage that a device can be designed so that a liquid manure vehicle charged with vacuum is provided for removing the liquid manure from the reservoir.

A device is particularly advantageous if the sensor is connected via a connection in the form of a connection line or wirelessly to an evaluating device.

It is particularly advantageous if the evaluating device is connected via a connection in the form of a connection line or wirelessly to the adjustable device respective to the distributor device. It can be an advantage if the connection line is an electrical or optional data line, or if the connection is wireless and can be designed as a mobile phone, data radio, infrared, Bluetooth or the like.

The invention is explained in more detail in the following by way of the drawings with reference to exemplary embodiments.

FIG. 1 shows a liquid manure vehicle designed as a trailer during the removal of liquid manure;

FIG. 2 shows an additional liquid manure vehicle designed as a trailer during the decanting of liquid manure;

FIG. 4 shows an embodiment in which the liquid manure is applied by means of a hose system.

Figure 3:
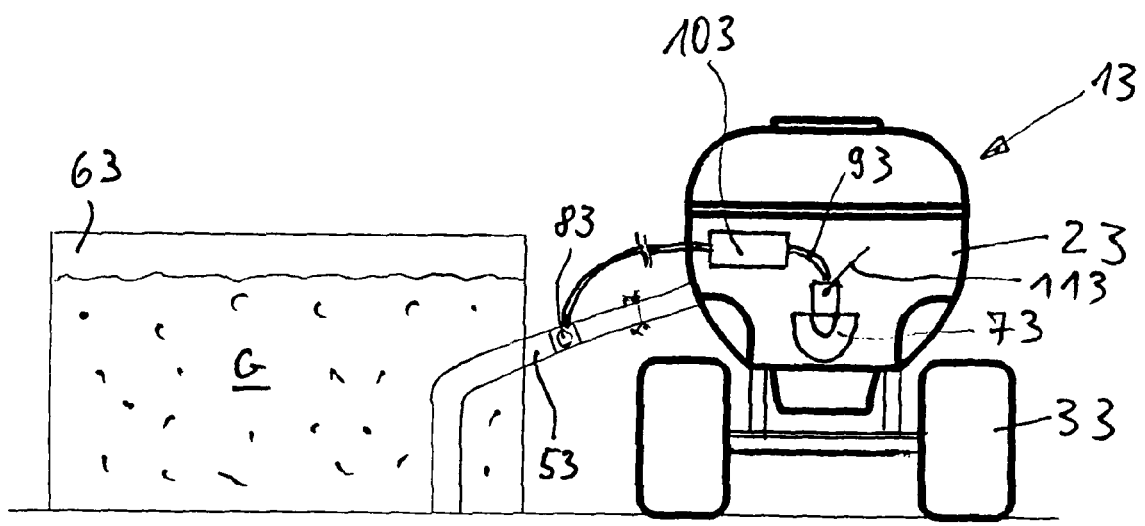
FIG. 3 shows a variant, in which the liquid manure vehicle is designed as a vacuum tank vehicle

FIG. 1 shows very schematically a liquid manure-tank vehicle in rear view. Reference numeral 1 denotes the entire liquid manure-tank vehicle, which comprises a tank 2 and a chassis 3. A pump denoted by the reference numeral 4 conveys by means of line system 5 the liquid manure G to be applied from a reservoir 6 into the tank 2. By means of a symbolically shown distributor device 7, for example a trailing hose device the liquid manure G can then be applied onto a field. Trailing hoses can be provided as the distributing device 7, which end close to the ground, so that also in this respect the application of liquid manure G is optimised. Additional liquid manure distributing devices such as liquid manure cultivators, slit distributors or other designs are advantageous to use, by means of which the liquid manure can be injected into the ground.

A sensor 8 is positioned at a suitable point in the line system 5 or—not shown—in the reservoir 6. The design of the sensor 8 is optional, but it must be suitable for analysing the liquid manure G with regard to its constituents just before application. A preferred design is an optically operating sensor 8, which subjects the liquid manure G to spectral analysis. The measurement data obtained by the sensor 8 are sent via connections 9 of an evaluating device 10, which controls an adjustable device in the form of a valve 11 on the basis of the control data via additional connections 9, so that the amount of liquid manure applied onto the ground by the distributor device 7—with regard to its constituents—corresponds as exactly as possible to the predefined constituents per area unit.

It can be seen that in this way the proportions of constituents measured just before application by the sensor 8 determine the amount of liquid manure to be applied. For this the measurement data in the evaluating device 10 are converted into control signals for the pump 4 and the valve 11 and the application amount is regulated according to required variables. The required variables can be the legal requirements or also required data, which are derived from the nutritional needs of the soil in general or the nutritional requirement of plants.

FIG. 2 shows in a similar schematic manner to FIG. 1 a liquid tank vehicle, which shows a liquid manure trailer 12. In a similar way to the liquid manure tank vehicle 1 according to FIG. 1 the liquid manure tank vehicle 12 comprises a chassis 32. A tank 22 receives the supply of liquid manure G to be applied. A pump denoted by the reference numeral 42 conveys by means of a line system 52 the liquid manure G from a reservoir 62 into the tank 22. The pump is designed as a mobile pump station 42 and can be used both in agricultural operation and field operation, which is portable or drivable or even mobile. The liquid manure tank vehicle 12 comprises a distributor device 72, by means of which the liquid manure G can be supplied subsequently. The distributor device 72 can also be of any design even in this exemplary embodiment. A valve 112 is located at a suitable point in the liquid manure tank vehicle 12 and can be designed as a sluice valve. In the line system 52 of the decanting area a sensor 82 is arranged. The design of the sensor 82 is also optional in this exemplary embodiment, it must be suitable for analysing the liquid manure G just before application with regard to its constituents. A preferred design is that of an optical sensor 82, which subjects the liquid manure G to a spectral analysis. The measurement data obtained by the sensor 82 is supplied via connections 92 to an evaluating device 102, which controls via additional connections 92 by means of an adjustable device such as the valve 112 depending on the result of the analysis of the liquid manure sensor 82 that the amount of liquid manure applied by the distributor device 72 onto the ground—relative to its constituents—corresponds as exactly as possible to the predefined constituents per area unit.

In these embodiments in which the sensor 8, 82 is arranged in the decanting area of the reservoir 6, 62, the liquid manure is analysed during the decanting from the reservoir 6, 62 into the tank 2, 22. This can be performed during the decanting from a stationary container on the agricultural land—as shown here—or also on the field, if the decanting is performed by transferring from a larger supply vehicle to a smaller application vehicle. As already described a mobile pump station 42 is most suitable for this. In both cases the analysis is performed during the decanting and just before the subsequent application for each individual tank load.

FIG. 3 also shows schematically a different embodiment of a liquid manure-tank vehicle 13. This design also comprises a chassis 33 and a tank 23 as well as a line system 53 and a valve 63, which pressurises the distributor device 73. Between the sensor 83 and an evaluating device 103 there is a connection 93 for data transmission, whereby via an additional connection 93 data is transmitted to an adjustable device in the form of the valve 63, which is controlled as a function of the result of the analysis of the liquid manure sensor 83 so that the amount of liquid manure applied by the distributor device 73 onto the ground—relative to its constituents—corresponds as exactly as possible to the predefined constituents per area unit.

Unlike the designs described above in this exemplary embodiment no pump is provided. The sensor 83 is arranged in a section of the line system 53, which is located between the tank 23 and a reservoir 63. The liquid manure-tank vehicle 13 is designed as a so-called vacuum vessel and the liquid manure G to be decanted is suctioned by a line system 53 from a reservoir 63 by means of the underpressure in the tank 23 and filled into the vacuum tank 24. During the decanting process the liquid manure G is analysed by the sensor 83, a comparison value is formed by the evaluating device 103 and the latter is used by means of an adjustable device in the form of a valve 113 for the application.

FIG. 4 shows a further variant of a liquid manure-application vehicle 14. In this embodiment two separate component groups are provided, namely a separate liquid manure-tank vehicle 14 and a liquid manure-distribution vehicle V in the form of a tractor. Also in this design the liquid manure-tank vehicle 14 comprises a chassis 34 and a tank 24 as well as a line system 54, which connects the liquid manure-tank vehicle 14 to the liquid manure-distribution vehicle V. The liquid manure-liquid manure-tank vehicle 14 carries an adjustable device in the form of controllable pump 114, which charges the distributor device 74. A sensor 84 is located in the line system 54, which is connected to the liquid manure-distribution vehicle V by way of a type of hosing. By means of a connection 94 the sensor 84 is connected to an evaluating device 104, which via an additional connection 104 by means of the adjustable device 114 depending on the result of the analysis of the liquid manure sensor 84 controls the distributor device 74, so that the amount of liquid manure applied onto the ground—in relation to its constituents—corresponds as exactly as possible to the predefined constituents per area unit.

The amount of liquid manure to be applied can also be regulated by the driving speed of the liquid manure distribution vehicle V. A combination of the conveyance of the controllable pump 114 and the travelling speed of the liquid manure vehicle V can also regulate the amount of liquid manure to be applied.

List of Reference Numerals

1 Liquid manure-tank vehicle; also: 12; 13; 14
2 Tank; also: 22; 23; 24
3 Chassis; also: 32; 33; 34
4 Pump; also: 42; 44
5 Line system; also: 52; 53; 54
6 Reservoir; also: 62; 63; 24
7 Distributor device; also: 72; 73; 74
8 Sensor; also: 82; 83; 84
9 Connection; also: 92; 93; 94
10 Evaluating device; also: 102; 103; 104
11 Adjustable device; also: 112; 113; 114

The invention claimed is:

1. A device for optimizing the application amount of constituents contained in liquid manure onto ground to be fertilized, comprising:
   a liquid manure tank vehicle,
   a sensor adapted to analyze the constituents of the liquid manure to be applied,
   an evaluating device adapted to compare data obtained analytically by the sensor with predefined constituent data,
   an adjustable device adapted to vary an amount of liquid manure to be applied per unit area, the adjustable device connected to the evaluating device by a connection such that the adjustable device receives via the connection comparison data from the evaluating device,
   a distributor device, wherein the adjustable device is connected to the distributor device and regulates the distributor device, such that the amount of liquid manure to be applied per unit area can be adjusted, and
   a decanting line system for decanting the liquid manure from a reservoir into the liquid manure tank vehicle,
   wherein the sensor is arranged in the decanting line system, such that the sensor is separated from the liquid manure tank vehicle, wherein the evaluating device and the adjustable device are arranged in or on the liquid manure tank vehicle, wherein the sensor and the evaluating device are adapted to communicate with each other by means of a temporary data connection when the liquid manure is decanted from the reservoir into the liquid manure tank via the decanting line system, and wherein the adjustable device is adapted to regulate the distributor device based on the data obtained by the sensor after the temporary data connection between the sensor and the evaluating device has been disconnected.

2. The device according to claim 1, comprising a pump for facilitating removal of the liquid manure from the reservoir.

3. The device according to claim 1, wherein a vacuum is provided to remove the liquid manure from the reservoir and to facilitate flow of the liquid manure into the liquid manure tank vehicle.

4. The device according to claim 1, comprising a mobile pump to decant the liquid manure into the liquid manure tank vehicle.

5. The device according to claim 4, wherein a mobile pump station is provided for decanting the liquid manure into the liquid manure tank vehicle.

6. The device according to claim 1, wherein the data regarding the amount of nitrogen and nitrogen-containing compounds obtained analytically by the sensor is transmitted via a connection line or wirelessly to the evaluating device.

7. The device according to claim 1, wherein the connection between the evaluating device and the adjustable device is in the form of a connection line or a wireless connection.

8. The device according to claim 6, wherein the connection line is an electrical or optical data line.

9. The device according to claim 6, wherein the wireless connection can be made via mobile phone, data radio, infrared, or wireless data communication device utilizing a wireless data communication standard.

10. The device according to claim 7, wherein the connection line is an electrical or optical data line.

11. The device according to claim 1, wherein the sensor is an optical sensor.

12. The device according to claim 11, wherein the optical sensor is adapted to subject the liquid manure to a spectral analysis.

13. The device according to claim 7, wherein the wireless connection can be made via mobile phone, data radio, infrared, or wireless data communication device utilizing a wireless data communication standard.

14. The device according to claim 1, wherein the sensor is adapted to analyze an amount of nitrogen and nitrogen-containing compounds in the liquid manure to be applied.

15. The device according to claim 1, wherein the distributor device is arranged in or on the liquid manure tank vehicle.

16. The device according to claim 1, wherein the distributor device is arranged in or on a separate distributor vehicle, the separate distributor vehicle being connected to the liquid manure tank vehicle by means of a line system during distribution of the liquid manure.

* * * * *